United States Patent [19]

Obayashi et al.

[11] 4,070,305

[45] Jan. 24, 1978

[54] PROCESS FOR REGENERATING CATALYST

[75] Inventors: Shigeji Obayashi, Akashi; Kanji Ueda, Ashiya; Haruhiko Iwatsubo, Habikino; Thoru Okabe, Hyogo, all of Japan

[73] Assignee: Seitetsu Kagaku Co., Ltd, Japan

[21] Appl. No.: 662,630

[22] Filed: Mar. 1, 1976

[30] Foreign Application Priority Data

Sept. 3, 1975 Japan .................................. 50-107428

[51] Int. Cl.$^2$ ..................... B01J 23/94; B01J 23/92; C01B 21/02; B01D 53/34
[52] U.S. Cl. ......................... 252/411 S; 423/239
[58] Field of Search ............... 252/411 S, 411 R; 423/239, 244; 55/73

[56] References Cited

U.S. PATENT DOCUMENTS

| | | | |
|---|---|---|---|
| 2,747,968 | 5/1956 | Pigache | 423/244 |
| 3,449,063 | 6/1969 | Griffing et al. | 423/213 |
| 3,501,897 | 3/1970 | Van Helden et al. | 423/244 |
| 3,864,451 | 2/1975 | Lee et al. | 423/239 |
| 3,914,390 | 10/1975 | Kudo et al. | 423/239 |

FOREIGN PATENT DOCUMENTS

| | | | |
|---|---|---|---|
| 804,316 | 2/1974 | Belgium | 423/239 |
| 804,317 | 2/1974 | Belgium | 423/239 |

OTHER PUBLICATIONS

*The Catalytic Chemistry of Nitrogen Oxides,* R. L. Klimisch & J. G. Larson, Plenum Press, N. Y. 1975, pp. 133-150.

*Primary Examiner*—Winston A. Douglas
*Assistant Examiner*—P. E. Konopka
*Attorney, Agent, or Firm*—Pollock, Vande Sande & Priddy

[57] ABSTRACT

Catalyst for removing nitrogen oxides, whose activity is lowered by poisoning with sulfur oxides, is contacted with an ammonia gas at a temperature of 200° to 500° C, whereby the sulfur oxides are liberated from the catalyst, and the catalyst is regenerated.

Concentration of the ammonia gas to be used in the regeneration treatment must be at least 1% by volume and preferably 5 to 50% by volume of ammonia is used in a mixture with other inert diluting gas. The regenerated catalyst is given an activity as high as that before the poisoning without bringing about any damage and cracking to the catalyst.

16 Claims, No Drawings

PROCESS FOR REGENERATING CATALYST

This invention relates to a process for regenerating a catalyst for removing nitrogen oxides, which is poisoned by sulfur oxides.

Atmospheric pollution by nitrogen oxides, which will be hereinafter referred to as $NO_x$, is now an important social problem, and researches have been recently vigorously carried out on treatment of flue gas containing $NO_x$. Above all, a process for removing $NO_x$ from flue gas by catalytic reduction of $NO_x$ to nitrogen, using ammonia is distinguished from other processes, for example, a process based on absorption in an alkaline solution, or a process based on absorption with an adsorbent such as activated carbon, in that the flue gas can be made harmless by simple operation, no secondary environmental polution due to treatment of the resulting effluent is brought about, and apparatus cost is cheaper.

As to processes for preparing catalysts to be used in said catalytic reduction, much literature and many reports have been so far disclosed (Japanese Laid-open patent application No. 6591/75, etc.). However, various kinds of effluent gases, for example, exhaust gas from automobiles, flue gas from various boilers including boilers of power station, flue gas from glass melting furnace, and flue gas from coke oven or sintering furnace of iron and steel plants, are included in the flue gas containing $NO_x$. In many cases, these flue gases contain a large amount of sulfur oxides such as $SO_2$, $SO_3$, etc., which will be hereinafter referred to as $SO_x$, in addition to dusts and $NO_x$. When $NO_x$ is removed from the flue gases by catalytic reduction, the catalyst is poisoned by $SO_x$, that is, fine pores of the catalyst are clogged, or active points of the catalyst are poisoned, or the catalyst is deteriorated by the formation of sulfate formed. These are problems to be solved at first in carrying out removal of $NO_x$ from flue gas.

An object of the present invention is to provide a novel process for regenerating catalysts poisoned by $SO_x$.

Another object of the present invention is to provide a process for regenerating the catalyst without causing any damage or crack on the catalyst.

Other object of the present invention is to provide a process for regenerating the catalyst, where the activity of the regenerated catalyst has a longer life than that of fresh catalyst.

As a result of extensive studies on a process for regenerating catalysts for removing NOx from flue gas, which are poisoned by $SO_x$, the present inventors have found that the poisoned catalysts can be very effectively reactivated and regenerated by contacting the poisoned catalysts with a gas containing at least 1% by volume of ammonia at a temperature of 200° to 500° C, and that sometimes the regenerated catalysts are less liable to be poisoned than the fresh catalyst.

As the catalysts for removing $NO_x$ from flue gas, simple substances or oxides of platinum, copper, iron, chromium, nickel, cobalt, molybdenum, manganese, vanadium, cerium, tungsten, ruthenium, etc. are used alone or in combination. These catalysts supported on carriers of alumina, silica or other inorganic porous material, etc. can be used, if desired. When these catalysts and carriers are used in removing $NO_x$ from the flue gas, they are more or less exposed to an atmosphere of $SO_x$, and are partially formed into sulfates or sulfuric acid adducts. Thus, the activity of catalysts is gradually lowered, and also the strength is deteriorated. However, it has been found that the activity of deactivated catalyst can be recovered by treating the catalyst deteriorated or deactivated by $SO_x$ in an ammonia gas atmosphere at a temperature of 200° to 500° C according to the present invention.

The gas to be used in the regeneration according to the present invention is a gas containing ammonia, and the gas having an ammonia concentration of 1% to 100% can be used. However, if the ammonia concentration is low, it takes a long time in liberating the poisoning components from the catalyst, whereas if the ammonia concentration is high, the liberation rate is increased, but sometimes the catalyst undergoes cracking owing to the rapid progress of reaction. Thus, it is preferable to use the gas containing ammonia at an ammonia concentration of 5 to 50% by volume.

As the diluting gas to be mixed with ammonia, an inert gas to the catalyst, for example, nitrogen, helium, argon, carbon dioxide, and steam, can be used alone or in combination. In that case, the inert gas may contain a small amount of oxygen, sulfur dioxide, etc., but it is not preferable to use a gas containing a large amount of said components, for the ammonia consumption is increased thereby.

In the present invention, the catalyst is regenerated at a temperature of 200° to 500° C. When the regeneration temperature is lower than 350° C, liberation reaction of the poisoning components is retarded, and a temperature lower than 200° C is very disadvantageous for the industrial practice. On the other hand, a regeneration temperature above 500° C is not preferable because it reaches the ammonia decomposition temperature, materials of construction of apparatus is also a problem, and cracking of the catalyst is very liable to take place.

According to the regeneration process of the present invention, an ammonia gas diluted with the diluting gas to the desired concentration is fed to a catalyst bed to bring the bed into an ammonia atmosphere. Usually, it is effective to circulate the ammonia gas. To maintain the ammonia gas at the desired concentration, the ammonia gas is supplemented with fresh ammonia only in an amount corresponding to that consumed in the catalyst bed.

To mantain the desired regeneration temperature, it is necessary to heat the catalyst bed and the gas containing ammonia by a suitable means, for example, thermoelectric heating, or heat exchange with hot gas, but when the $NO_x$ removing operation is stopped and successively a regeneration operation is carried out, the heat possessed by the catalyst bed can be advantageously utilized as such, for the regeneration operation can be immediately carried out.

Regeneration mechanism of the catalyst according to te present invention is not clear, but the following several steps can be assumed. For example, when a poisoned iron oxide catalyst is subjected to the ammonia treatment, it can be assumed that the steps would proceed according to the following reaction formulae:

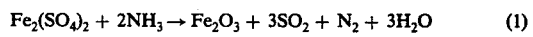

$$Fe_2(SO_4)_2 + 2NH_3 \rightarrow Fe_2O_3 + 3SO_2 + N_2 + 3H_2O \tag{1}$$

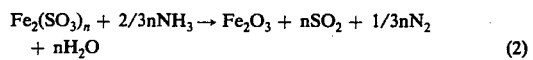

$$Fe_2(SO_3)_n + 2/3nNH_3 \rightarrow Fe_2O_3 + nSO_2 + 1/3nN_2 + nH_2O \tag{2}$$

wherein $n$ represents a positive number.

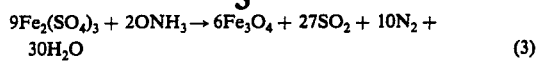

(3)

When given in the general formula, it can be assumed:

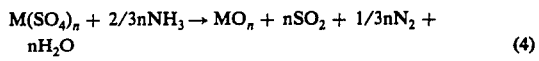

wherein M represents a metal constituting the catalyst or the carrier, and $n$ a positive number. Furthermore, it can be presumed that the sulfates and $SO_4$ adducts are decomposed without any reduction, and attracted by the ammonia gas having a strong affinity and vaporized. In brief, the sulfates and $SO_4$ adducts are utilimately reduced and liberated, or vaporized, and the catalyst is regenerated thereby.

According to the present invention, the poisoned catalyst can be regenerated in the packed column without withdrawing the catalyst from the column, and thus the reactivation and regeneration of the catalyst can be carried out without deteriorating the quality of the catalyst, such as cracking, damage, etc. of the catalyst. The present process is applicable to all the catalysts poisoned with $SO_x$ or the catalysts with adsorbed $SO_x$, but the present process can be effectively carried out for the catalysts containing iron oxides or oxides of chromium, vanadium, etc. as an effective component, among the above-mentioned catalysts for removing $NO_x$. In that case, such unexpected effect that the regenerated catalyst has a longer life against deterioration than fresh catalyst can be obtained. The present process can be also applied in regeneration of catalysts used in other chemical reactions, for example, catalysts used in water gas reaction and poisoned with $SO_x$.

EXAMPLE 1

$Fe_2O_3$ catalysts having sizes of 8 mm × 7 mm × 7 mm (SARC: trademark of Seitetsu Kagaku Co., Ltd., Japan), which were poisoned by $SO_x$ in operation to remove $NO_x$ from flue gas, whose weight was increased by 14% thereby and whose $NO_x$ conversion was reduced to 36% from 98% of the initial state, were packed into a Pyrex tube having an inner diameter of 25 mm up to a height of 80 mm to form a catalyst bed. A gas consisting of 10% $NH_3$ and 90% $N_2$ was passed through the catalyst bed at a flow rate of 1 ml/min. per gram of the catalysts for 20 hours, while maintaining the catalyst bed at a temperature of 380° to 400° C. As a result, $SO_x$ was liberated from the catalysts, and the weight of the catalysts was completely returned to the initial weight. Then, the resulting catalysts were again subjected to the $NO_x$-removing operation under the conditions shown in Table 1, without changing the packing state of the catalyst bed. Catalytic activity of the catalysts could be returned to that of fresh catalyst, as shown in Table 2.

EXAMPLE 2

The same poisoned catalysts as in Example 1 were packed in the same tube under the same conditions as in Example 1, and a 100% ammonia gas was passed through the catalyst bed at a flow rate of 0.5 ml/min per gram of the catalysts at a temperature of 350° to 400° C for 5 hours. Then the catalysts were subjected to $NO_x$-removing operation under the conditions shown in Table 1, without changing the packing state of the catalyst bed, and the same results as in Example 1 were obtained. When the regenerated catalysts were subjected to poisoning under the same conditions as in Table 1 except that $SO_x$ content was changed to 2000 ppm and $N_2$ content to 72.90%, the time required for reduction of $NO_x$ conversion to 36% was extended to about 1.5 times that of fresh catalyst.

EXAMPLE 3

The same poisoned catalysts as in Example 1 were packed in the same tube under the same conditions as in Example 1, and a gas consisting of 5% $NH_3$, 94% $N_2$ and 1% $O_2$ was passed through the catalyst bed at a flow rate of 10 ml/min per gram of the catalysts at 420° C for 20 hours. Then, the catalysts were subjected to $NO_x$-removing operation under the conditions shown in Table 1 without changing the packing state of the catalyst bed, and $NO_x$ conversions shown in Table 3 were obtained.

EXAMPLES 4 – 6

$Fe_2O_3$ catalysts in ring forms having an outer diameter of 35 mm, inner diameter of 20 mm, and height of 15 mm (SARC: trademark of Seitetsu Kagaku Co., Ltd., Japan) were packed in a stainless steel, $NO_x$ removal column having a diameter of 350 mm up to a height of 4.2 m, and an actual boiler flue gas containing $SO_x$ originating from fuel oil burning, to which $SO_x$ was intentionally added to make a $SO_x$ concentration 500 ppm, was continuously passed through the $NO_x$ removal column for a long time, until $NO_x$ conversion of the catalysts was lowered to 85% from 95% of the initial state at 400° by $SO_x$ poisoning. The poisoned catalysts was then contacted with individual gases having compositions and at temperatures shown in Table 4 at a flow rate of average 60 l/hr per gram of the catalysts for 20 hours. The catalysts could be regenerated without any damage such as cracking of the catalysts or without lowering the mechanical strength of the catalysts. The regenerated catalysts were subjected to $NO_x$-removing operation at various reaction temperatures under the same conditions as in Table 1, and $NO_x$ conversions shown in Table 3 were obtained.

Table 1

| Gas composition | $NH_3$ | $H_2O$ | $O_2$ | $CO_2$ | $SO_x$ | NOx | $N_2$ |
|---|---|---|---|---|---|---|---|
| Concentration | 400 ppm | 10% | 5% | 12% | 300 ppm | 400 ppm | 72.89% |

Space velocity: 3000 hr$^{-1}$
Temperature: 400° C

Table 2

| | | NOx conversion | | | | |
|---|---|---|---|---|---|---|
| Catalysts | Reaction temperature | 270° C | 300° C | 350° C | 400° C | 420° C |
| Fresh catalyst | | 63% | 80% | 95% | 98% | 98% |
| Poisoned catalyst | | 19% | 20% | 25% | 36% | 40% |

Table 2-continued

| Catalysts | Reaction temperature | NOx conversion | | | | |
|---|---|---|---|---|---|---|
| | | 270° C | 300° C | 350° C | 400° C | 420° C |
| Regenerated catalyst | | 63% | 80% | 92% | 97% | 98% |

Table 3

| Example No. | Reaction temperature | NOx conversion | | | | |
|---|---|---|---|---|---|---|
| | | 270° C | 300° C | 350° C | 400° C | 420° C |
| 3 | | 60% | 79% | 90% | 95% | 95% |
| 4 | | 65% | 80% | 95% | 98% | 98% |
| 5 | | 65% | 80% | 95% | 98% | 98% |
| 6 | | 65% | 80% | 95% | 98% | 98% |

Table 4

| Example No. | Regeneration temperature | Regeneration time | Regenerating gas composition | | |
|---|---|---|---|---|---|
| | | | $NH_3$ | $N_2$ | $H_2O$ |
| 4 | 430° – 450° C | 8 hr | 60% | 36% | 4% |
| 5 | 410° – 430° C | 10 hr | 30% | 66% | 4% |
| 6 | 400° – 430° C | 10 hr | 5% | 91% | 4% |

EXAMPLES 7 – 9

$Fe_2O_3$ catalysts (SARC-F: trademark of Seitetsu Kagaku Co., Ltd., Japan), $CuO$-$Cr_2O_3$ catalysts (SARC-C: trademark of Seitetsu Kagaku Co., Ltd., Japan) and $V_2O_5$ catalysts (SARC-V: trademark of Seitetsu Kagaku Co., Ltd., Japan), each being supported on individual activated alumina carriers having diameters 4 – 6 mm, surface area of 350 m²/g and packed density of 750 kg/m³ were packed in the same individual column as used in Examples 4 – 6 up to a height of 0.4 m, and poisoned with $SO_x$ under the same conditions as in Examples 4 – 6. The poisoned catalysts were contacted with a gas consisting of 15% $NH_3$ and 85% $N_2$ at 420° C for the SARC-F catalysts, 450° C for the SARC-V catalysts, and 500° C for the SARC-C catalysts at a flow rate of average 180 l/hr per gram of the catalysts for 10 hours.

The regenerated individual catalysts were subjected to $NO_x$-removing operation at various reaction temperatures under the same conditions as in Table 1, and results as shown in Table 5 were obtained. $NO_x$ conversions were equal to that of fresh catalysts.

Table 5

| Example No. | Catalyst | NOx conversion | | | | | |
|---|---|---|---|---|---|---|---|
| | | 150° C | 200° C | 250° C | 300° C | 350° C | 400° C |
| 7 | Alumina-supported $Fe_2O_3$ | — | — | 40% | 64% | 85% | 93% |
| 8 | Alumina-supported $CuO$-$Cr_2O_3$ | 90% | 95% | 97% | 98% | — | — |
| 9 | Alumina-supported $V_2O_5$ | — | 40% | 85% | 97% | 99% | — |

EXAMPLES 10 – 11

$Fe_2O_3$ – $V_2O_5$ catalysts containing 20% by weight of V, based on the total weight (SARC-FV: trademark of Seitetsu Kagaku Co., Ltd., Japan) and $Fe_2O_3$ – $CuO$ catalysts containing 25% by weight of Cu, based on the total weight (SARC-FC: trademark of Seitetsu Kagaku Co., Ltd., Japan), each in pellet forms having diameters of 5 to 7 mm, were subjected to $NO_x$-removing opera-tion of a gas containing 1500 ppm $SO_x$, 500 ppm NO, 10% $CO_2$, 4% $O_2$, and the balance being $N_2$, to which 600 ppm $NH_3$ was added, at a temperature of 350° C and a space velocity of 5,000 hr⁻¹. Initial $NO_x$ conversion was 93% for the SARC-FV catalysts, and 90% for the SARC-FC catalysts.

When the $NO_x$-removing operation was continued under the same conditions as above, the catalysts reacted with $SO_x$ contained in the gas, and pores of the catalysts were clogged thereby. $NO_x$ conversions were lowered to 50%.

The individual catalysts were regenerated with a gas consisting of 30% $NH_3$ and 70% $N_2$ at a flow rate of 20 l/hr per gram of the catalysts at 410° C for 20 hours. The regenerated individual catalysts were again subjected to $NO_x$-removing operation under the same conditions as above. The individual catalysts were found to be reactivated to the same activities as those of fresh SARC-FV catalysts and SARC-FC catalysts, respectively.

What is claimed is:

1. A process for regenerating a catalyst used for removing nitrogen oxides from flue gas by catalytic reduction with ammonia and wherein said catalyst is an oxide of a metal selected from the group consisting of copper, iron, chromium, vanadium, and mixtures thereof, and said catalyst is poisoned by the formation of sulfates with sulfur oxides contained in said flue gas, which process comprises contacting said poisoned catalyst at a temperature of 350° to 500° C with a gaseous mixture consisting essentially of at least 1% by volume of ammonia and a substantially inert gas and for a time sufficient for regenerating said catalyst to liberate the sulfur oxides thereby from said catalyst, whereby said catalyst is regenerated.

2. The process of claim 1 wherein said inert gas is selected from the group consisting of nitrogen, helium, argon, cabon dioxide, steam, and mixtures thereof.

3. The process of claim 1 wherein said gas consists of 10% $NH_3$ and 90% $N_2$.

4. The process of claim 1 wherein said gas is 100% ammonia.

5. The method of claim 1 wherein said gas consists of 5% $NH_3$, 94% $N_2$, and 1% $O_2$.

6. The method of claim 1 wherein said gas consists of 15% $NH_3$ and 85% $N_2$.

7. The method of claim 1 wherein said gas consists of 30% $NH_3$ and 70% $N_2$.

8. The method of claim 2 wherein said gas also contains oxygen or sulfur dioxide in small amounts insufficient to significantly increase the ammonia consumption.

9. The method of claim 1 wherein said catalyst is supported on an inorganic porous material.

10. The method of claim 9 wherein said inorganic porous material is alumina or silica.

11. The method of claim 1 wherein the catalyst is supported on an alumina carrier.

12. The method of claim 1 wherein said catalyst comprises iron oxide and at least one other oxide of a metal selected from the group consisting of copper, chromium, vanadium, and mixtures thereof.

13. The method of claim 1 wherein said gas contains 5 to 50% by volume of ammonia.

14. The method of claim 1 wherein said catalyst comprises iron oxide.

15. The method of claim 1 wherein said catalyst comprises an oxide of vanadium.

16. The method of claim 1 wherein said catalyst comprises oxides of copper and of chromium.

* * * * *